(12) United States Patent
Berman et al.

(10) Patent No.: US 6,502,194 B1
(45) Date of Patent: Dec. 31, 2002

(54) SYSTEM FOR PLAYBACK OF NETWORK AUDIO MATERIAL ON DEMAND

(75) Inventors: Russell Todd Berman, San Jose, CA (US); Michael Andrew Radford, Los Angeles, CA (US); Brett Austin Kennedy, Santa Monica, CA (US); David Kiyoshi Matsumoto, San Jose, CA (US)

(73) Assignee: Synetix Technologies, San Francisco, CA (US)

( * ) Notice: Subject to any disclaimer, the term of this patent is extended or adjusted under 35 U.S.C. 154(b) by 0 days.

(21) Appl. No.: 09/293,252

(22) Filed: Apr. 16, 1999

(51) Int. Cl.⁷ .................. H04L 12/00; G06F 13/372
(52) U.S. Cl. .................. 713/201; 713/200; 709/231; 370/231; 370/352; 370/310; 370/468; 705/51; 705/26
(58) Field of Search .............. 705/51, 57, 26, 705/27; 713/200, 201; 370/69.1, 231, 352, 354, 310, 468; 709/231, 233, 235

(56) References Cited

U.S. PATENT DOCUMENTS

| | | | |
|---|---|---|---|
| 4,788,675 A | 11/1988 | Jones et al. | 370/69.1 |
| 4,829,372 A | 5/1989 | McCalley et al. | 358/86 |
| 5,544,228 A | 8/1996 | Wagner et al. | 379/67 |
| 5,553,140 A | 9/1996 | Kubota et al. | 380/10 |
| 5,635,979 A | 6/1997 | Kostreski et al. | 348/13 |
| 5,790,423 A | 8/1998 | Lau et al. | 364/514 |
| 5,822,537 A | * 10/1998 | Katseff et al. | 370/231 |
| 6,138,147 A | * 10/2000 | Weaver et al. | 707/104.1 |
| 6,222,838 B1 | * 4/2001 | Sparks et al. | 370/352 |
| 6,246,672 B1 | * 6/2001 | Lumelsky | 370/310 |

* cited by examiner

Primary Examiner—Ly V. Hua
(74) Attorney, Agent, or Firm—David A. Hall

(57) ABSTRACT

A playback unit resembling a home audio component, retrieves audio data from a remote server and plays them back in real time, using a home audio system, in response to user selection. The playback unit provides an interface between a network source for audio material, such as the Internet, and a conventional home audio system for playback. The playback unit has a relatively simple operating system that does not require a lengthy boot-up sequence, cannot be accessed by the user, and does not require the launch of special software to initiate playback. Access to audio material and distribution rights can be controlled by network servers. In this to way, the playback unit can retrieve audio material from the network on demand, thereby vastly expanding the range of music available for playback, and can reproduce that music using the home audio system for high quality playback in a comfortable setting, with controlled access to audio material and controlled distribution and duplication of the material.

24 Claims, 10 Drawing Sheets

SYSTEM FOR PLAYBACK OF NETWORK AUDIO MATERIAL ON DEMAND

BACKGROUND OF THE INVENTION

1. Field of the Invention

This invention relates generally to music playback systems and, more particularly, to playback of network audio material in response to user command.

2. Description of the Related Art

Two popular means of listening to digitally encoded audio material are conventional home audio music playback systems that include conventional media players that reproduce recorded music information and computer-based systems that typically include a standard personal computer (PC) or similar machine capable of utilizing a variety of digital music formats, including pre-recorded media and computer audio files. Both types of systems permit users to initiate playback of a selected piece of audio material, such as recorded songs or other music.

Conventional home audio music systems typically include a player that accepts media encoded with digital audio material. Such media include the compact disc (CD), MiniDisc (MD), and digital audio tape (DAT) formats. The CD format comprises a plastic-coated aluminum substrate from which digital audio material can be optically retrieved. The MiniDisc is a magneto-optical storage format. The DAT format comprises a tape substrate with a magnetic recording layer in which digital audio material is magnetically recorded. The CD format is the most popular current means of delivering recorded music and offers the largest library of recorded works for selection. Other popular media for playback of digital music information include the "Laserdisc" (LD) format and the "Digital Video Disc" (DVD) format, both of which can combine video information with music or other digital audio information. All of these formats offer a relatively stable recording media, high quality audio reproduction, convenient storage and playback, and simple operation of players.

Home audio players, such as CD players and DAT players, can provide exceptional quality sound reproduction, made all the better because such players are typically connected to a relatively good quality, home high-fidelity music system. The CD format discs are convenient because they are especially easy to store and take up comparatively little storage space. Playback of CDs also is convenient, because the CD player is ready to read the digital audio material upon power-up of (application of electrical power to) the player. For playback the discs are simply inserted into a CD player's tray or slot and started with simple one-button operation. In addition, such home music systems are typically arranged in a comfortable setting within the home. Such home music systems typically include, in addition to the CD player that reads the digital audio material and produces a playback signal, one or more amplification and control devices, signal processors, and power amplifiers to process and amplify the analog playback signal, and also a set of loudspeakers, to receive the amplified playback signal and convert it to sound.

Home music systems permit a user to initiate playback on demand by the selection of an appropriate disc or tape media. The selection, however, must be made from the user's personal collection of media on hand, which limits the available music to that which the user has purchased, borrowed, or otherwise received. This limits the repertory from which the user may select and discourages many users from review of and experimentation with audio material and musical products. This is undesirable from the perspective of the music industry, because it is believed that such experimentation and review can lead to further sales of recorded audio material. Borrowing media from another user or from a commercial enterprise, thereby expanding the library of material available to include that which is maintained by acquaintances or rental shops but this is not convenient.

In contrast to the home audio system with CD or DAT player, the conventional computer-based system with appropriate software and hardware can provide music either from pre-recorded digital media or from computer audio files. For purposes of this discussion, the computer-based playback system will be referred to as a PC-based system, regardless of the computer on which it is based.

If the PC-based system includes a CD-ROM drive and sound card, for example, a CD with digital audio material can be inserted into the drive and the sound recorded on the CD can be listened to through PC speakers that receive output from the sound card. This mode of listening has the same limitations of repertoire as the home audio CD player. Moreover, the typical PC-based system does not have audio components as good as that of the typical home audio system, and is usually not located in as comfortable a setting as the typical home audio system.

A PC-based system with access to a network such as the Internet can, with the appropriate software, download audio material for playback. This audio material can comprise, for example, digitized sound clips stored as ".wav" files, MPEG (Motion Picture Experts Group) Audio Layer 3 (MP3) compressed-audio files, streaming audio formats for continuous play of audio material, and other digital formats for the storage of audio material, all of which can be stored on a fixed media and received by the PC. More recently, another sound file format called the Secure Digital Music Initiative (SDMI) has been proposed. Alternatively, the audio material can be received from a network file server, and then stored on the hard drive of the PC itself. Additional software can be used for convenient organization of downloaded music files. Other audio material may comprise streaming audio files, which require additional streaming audio playback software.

Such network downloading of music can vastly expand the repertory from which the user may select, and encourages review of and experimentation with audio material. Again, however, the PC-based system provides limited enjoyment because the typical PC-based system does not have audio components as good as that of the typical home audio system, and is usually not located in as comfortable a setting as the typical home audio system. Furthermore, the PC-based system is not as convenient to use as the home audio system, because the PC is typically located in a work environment away from the home audio system, and the operating system of the PC requires an initial lengthy boot-up process that loads an operating system from peripheral storage, the launching of appropriate player software, and the navigation of a potentially complicated software interface with multiple windows and drop-down menus to select before initiating playback each time the user wants to listen to audio material.

In addition, operating a PC-based system, gaining Internet access, and downloading audio files can require computer skills not possessed by the average listener, in addition to requiring the initial purchase of the computer equipment. Peripheral playback devices also may need to be installed on the PC-based system, requiring knowledge of the operating system and peripheral interface, and some of these formats only provide low-fidelity playback that is adequate for audio while working at the computer, but is not useful as an adjunct or replacement for the home audio system and CD player.

Some forms of PC-based systems also are meeting with resistance from commercial music industry interests and from artists because of the potential for widespread copyright violation and the difficulty of policing the download and duplication of audio information files by users. The availability of network databases and the download and duplication of audio files make it almost impossible to monitor and control the distribution of recorded musical performances. Some PC-based systems also may be problematic in view of governmental regulation, such as the Audio Home Recording Act passed by the U.S.A. legislature, which under certain conditions mandates a serial copy management system (SCMS) to control digital copying. It would be advantageous to provide a system that is capable of interfacing with home audio systems for high quality playback, that has access to the large repertory possible through network databases, and would have the acceptance of commercial music interests and artists.

From the discussion above, it should be apparent that there is a need for a system that can provide playback of a wide range of audio material on demand, using the home audio system for high quality playback, without requiring sophisticated computer skills, and with controlled access to audio material and controlled distribution and duplication of the material. The present invention fulfills this need.

SUMMARY OF THE INVENTION

The present invention provides a system for playback of network audio material on demand by using a playback apparatus that provides an interface to network audio files that are retrieved in real time in response to user selection. In accordance with the invention, the playback unit provides an interface between a conventional home audio system and a network source for audio material, such as the Internet. The playback unit has a relatively simple built-in operating system that is not accessed from peripheral storage, does not require a lengthy boot-up sequence, and cannot be manipulated without the authorization of the manufacturer or network source. As a result, the playback unit can be operated without special computer skills or navigation of complicated PC-like windows. Receipt of audio material and enforcement of distribution rights can be controlled by network servers that provide the audio material to the playback unit. In this way, the playback unit can retrieve a wide range of digital audio material from the network on demand, thereby vastly expanding the range of music available for playback, can reproduce that music using the home audio system for high quality playback in a comfortable setting, and can provide controlled access to audio material and controlled distribution and duplication of the material.

The playback unit includes a user interface and display component, which presents an easy-to-use interface that simulates playback controls that might be found on a conventional player such as a CD player or DAT player. The user interface and display component substantially duplicates the appearance of a conventional home audio player control panel, such as CD player buttons and track displays. The playback unit also includes memory for holding program instructions and temporarily storing audio material for playback so it is not accessible to the user, and includes a microprocessor that controls operation of the playback unit. In one aspect of the invention, the playback unit includes a network interface to communicate with the network, send user commands, and receive audio material. The network interface can communicate using a number of different protocols having a variety of physical connection schemes, such as telephone line modem connections, high-speed Ethernet connections, and cable modem connections. The playback unit also includes an output interface that receives the audio material and provides it to the home audio system in a format that can be reproduced by that system.

Other features and advantages of the present invention should be apparent from the following description of the preferred embodiment, which illustrates, by way of example, the principles of the invention.

DESCRIPTION OF THE PREFERRED EMBODIMENT

Figure 1:
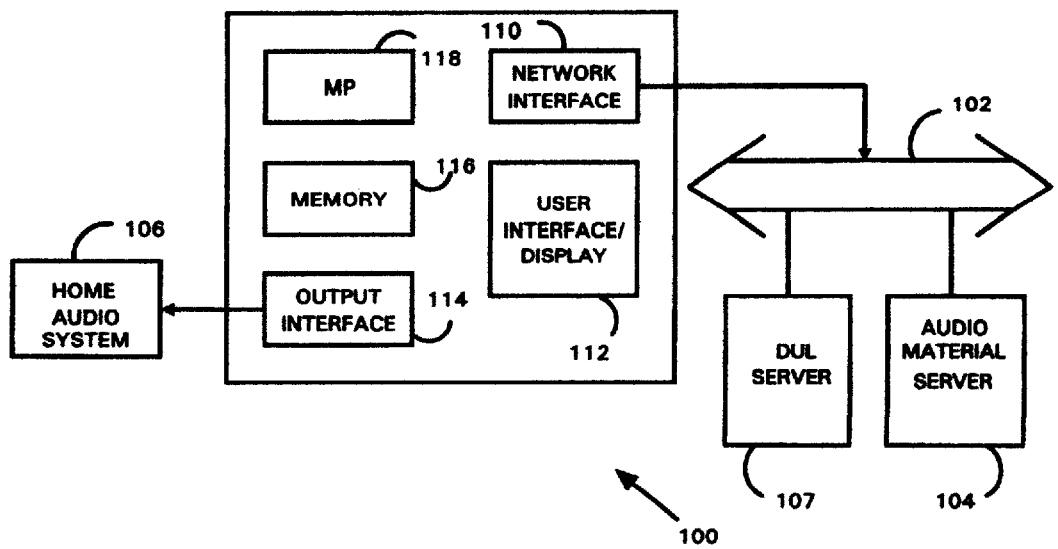
FIG. 1 is a block diagram of a playback unit constructed in accordance with the present invention showing the connections to a home audio system and a network.

FIG. 1 illustrates a playback unit 100 constructed in accordance with the present invention. The playback unit communicates over a network, such as the Internet 102, to request digital audio material from one or more audio material servers 104. The playback unit receives audio material from an audio material server and provides it to a conventional home audio system 106 for playback. The playback unit 100 has a simple operating system that accesses instructions from high-speed semiconductor memory, does not require a lengthy boot-up sequence, and cannot be manipulated by the user. Thus, the playback unit does not require the user to launch special software such as the "Windows 98" operating system by Microsoft Corporation to initiate playback, and therefore the playback unit is very stable in operation and can be operated without special computer skills or navigation of complicated PC-like windows. Access to the audio material and authority for distribution rights are preferably controlled by a directory and user list (DUL) server 107 described further below. In this way, the playback unit 100 can retrieve a wide range of digital audio material from the network upon user demand, thereby vastly expanding the range of music available for playback, and can reproduce that music using the home audio system for high quality playback in a comfortable setting.

The playback unit 100 is most likely to be installed adjacent to the home audio equipment 106, which typically includes a variety of amplifier, processor, receiver, control, and record/playback units. The playback unit 100 comprises a stand-alone device that is preferably the same size as the individual home audio system devices, so as to be physically and aesthetically compatible with them. The playback unit includes a network interface 110 that provides a communication channel with the Internet 102 and to the audio material server 104. The network interface can communicate using a number of different protocols having a variety of physical connection schemes, such as telephone line modem connections, high-speed ISDN and Ethernet connections, and cable modem connections.

Playback Unit Components

The playback unit 100 includes a user interface and display component 112, which presents an easy-to-use interface that substantially duplicates the appearance of typical user-operable controls that might be found on a conventional home audio player that plays physical media, such as a CD player or a DAT player. These controls may include, for example, PLAY, STOP, FORWARD, BACKWARD, PAUSE, TRACK, and SELECT buttons. In the preferred embodiment, the user interface and display component 112 includes a touch panel or screen that responds to user activation of virtual buttons shown on the display screen. The function represented by the activated display button is then executed by the playback unit. The touch panel permits easy updates to the player functionality by changing the buttons and their operation with new program instructions stored in memory, as described below. Alternatively, the buttons may comprise actual physical buttons that have an electromechanical interface so they respond to physical pressure by producing a signal that activates the corresponding function.

Figure 2:
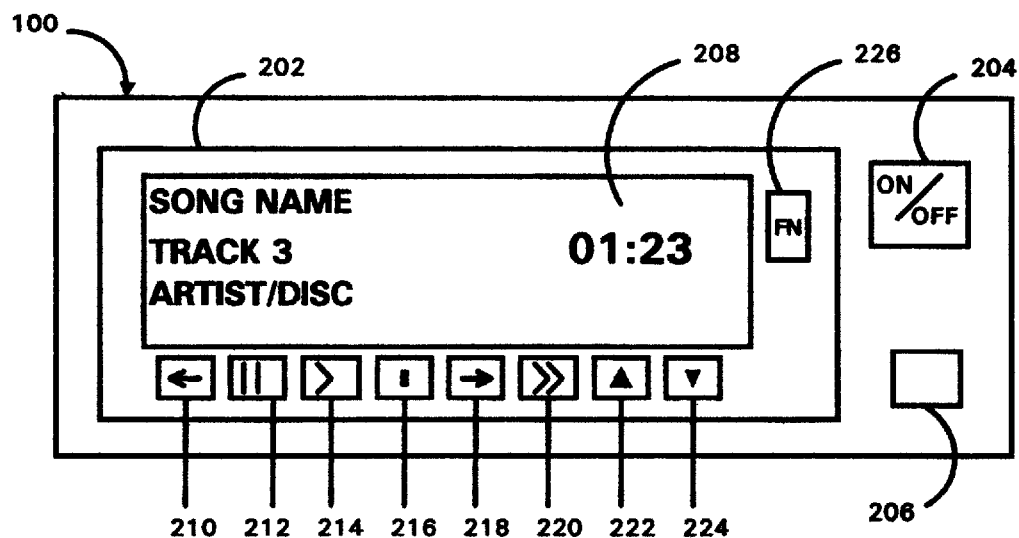
FIG. 2 is a representation of the screen display shown on the user interface of the playback unit illustrated in FIG. 1.

FIG. 2 shows an exemplary display interface comprising a touch panel screen 202 of the playback unit 100. The playback unit preferably includes at least one physical button, a power button 204 that initiates the application of electrical power to the circuits of the playback unit. The playback unit may also include a sensor, such as an infrared sensor 206, for receiving command signals from a remote control unit (not illustrated). The display interface has a display area 208 on which playback status information is shown. For example, FIG. 2 shows the display area 208 with a list of song or selection name, track number, artist name or disc (compilation), and song playing time. The display interface may include virtual operation buttons, or actual physical buttons, that cause operations such as reverse 210, pause 212, play 214, stop 216, forward 218, fast forward/skip 220, cursor navigation up 222 and down 224, and a function select 226 button. As noted above, the buttons 210–226 may be virtual buttons of a touch panel screen 202 also having a status information display area 208, or may be physical buttons adjacent a display area 208 in which alphanumeric information is shown.

Returning to the illustration of FIG. 1, the playback unit 100 also includes an output interface 114, memory 116, and microprocessor 118. The output interface processes the audio material and provides it to the home audio system in a format that can be used by that system. The connection to the home audio system 106, for example, can comprise a direct wire connection to home audio loudspeakers that receive an analog signal, or can be a connection to a signal processor, receiver, or other control and/or amplification device for playback using the loudspeakers of the home audio system. The memory 116 holds data including program instructions and temporarily stores audio material for processing and playback. The memory may comprise a combination that includes, for example, semiconductor memory such as electrically erasable programmable read only memory (EEPROM) or flash memory for holding program instructions and buffer memory for holding song data (audio material).

The program instructions are automatically executed by the microprocessor 118 when power is applied to the playback unit. Thus, there is no need to access an operating system stored on a disk drive or other peripheral storage device to operate the playback unit. As a result, the playback unit does not require an electromechanical storage device (such as a disk drive), is very stable in operation, and does not require a boot-up sequence. The buffer memory for audio material storage is preferably dynamic random access memory (RAM), which is a low-cost, efficient means of temporarily storing digital audio material to be processed for playback. In addition, the volatility of the buffer memory ensures that the user has no permanent copy of the audio material, thereby ensuring protection of copyrighted material. As described further below, storage of the audio material in the memory is determined by data downloaded through the network interface 110, and therefore is externally controlled.

The playback unit 100 operates under control of the microprocessor 118, which controls operation of the other playback unit components 110, 112, 114, 116. The microprocessor also performs the various calculations and computations required for processing the audio material and preparing it for playback. If desired, the microprocessor component 118 may work along with a specialized digital signal processing (DSP) circuit for performing sound data computations and, if necessary, audio material data decompression. As noted above, the program steps executed by the microprocessor are stored in a program instruction flash memory portion of the memory 116. Therefore, although the user cannot change the operating system instructions, the playback unit operation is fully determined by the stored program instructions, which can be changed by loading new instructions into the memory 116. This permits changing, for example, the display buttons to provide new functions.

Playback Unit Operating Steps

Figure 3:
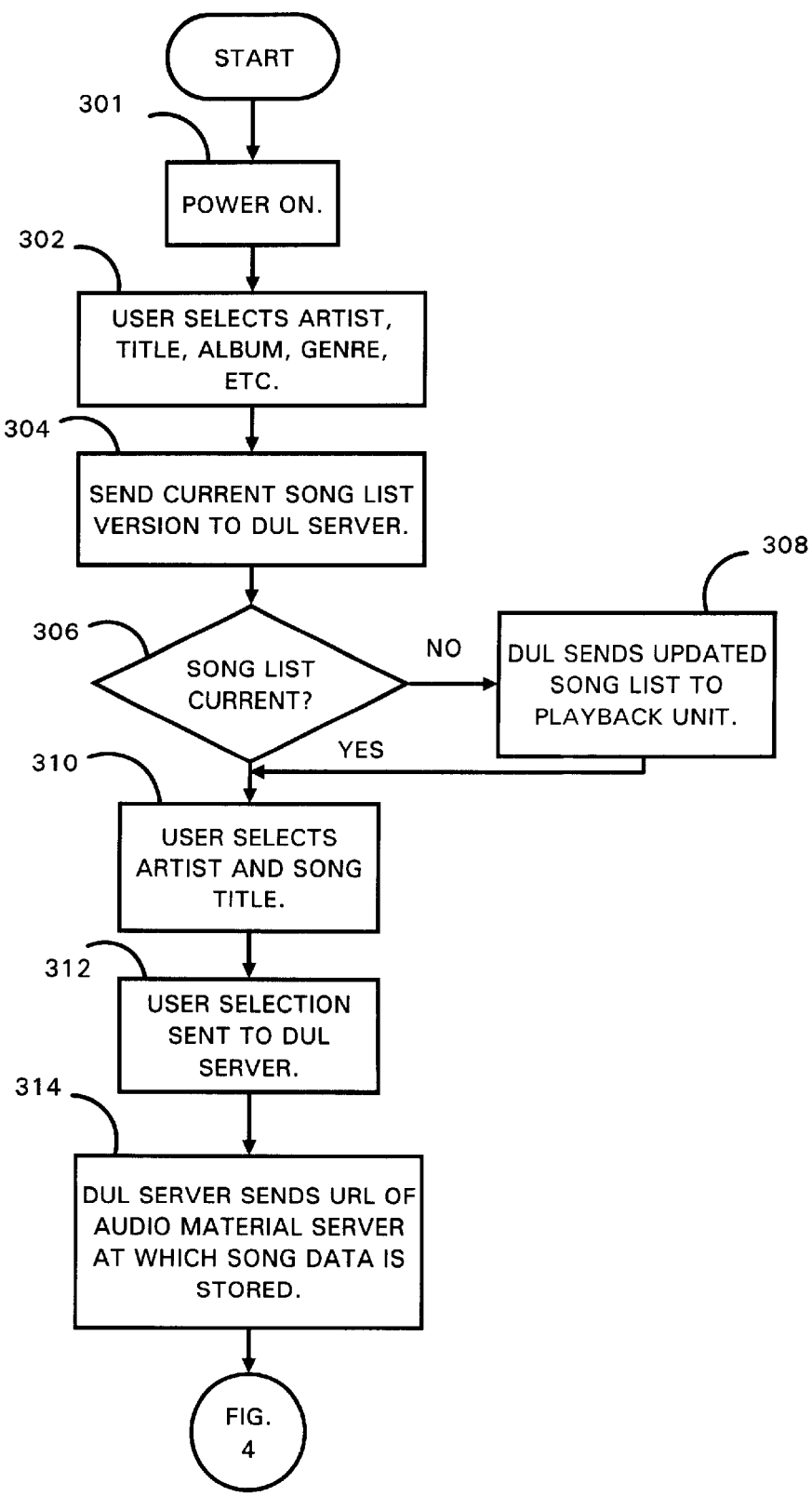
FIG. 3 and FIG. 4 are processing flow diagrams that illustrate the processing steps executed by the components illustrated in FIG. 1 to request, receive, and play audio material from the network.

FIG. 3 is a flow diagram of the processing steps executed by the microprocessor 118 of FIG. 1, and illustrates the processing carried out by the playback unit 100 in response to user commands. An initial step, as represented by the flow diagram box numbered 301, occurs when electrical power is applied to the playback unit. As noted above, the operation of the playback unit is sufficiently simple so that no operating system loaded from peripheral storage is required, therefore, there is no boot sequence, and the user cannot alter system operation of the playback unit. As a result, upon the application of electrical power, the playback unit 100 is immediately operational.

In the first operational step, represented by the flow diagram box numbered 302, the user selects a music category or type of song desired for playback from a list. This list may include categories such as the artist, the song title, the album, and musical genres. In addition, the user may limit search results by confining the query to specific, user-defined categories. The generated list appears on the display area of the user interface. In the next step, the playback unit sends the version of the current song list to the directory and user list (DUL) server 107, shown in FIG. 1. During this step, the DUL server also can perform user list checks and authorization confirmation, if desired. In this way, the DUL server acts as a "gatekeeper" to ensure that only appropriate users are being granted access to the audio material, thereby ensuring commercial music interests and artists have desired control over distribution. The flow diagram box numbered 304 represents this operational step.

Figure 4:
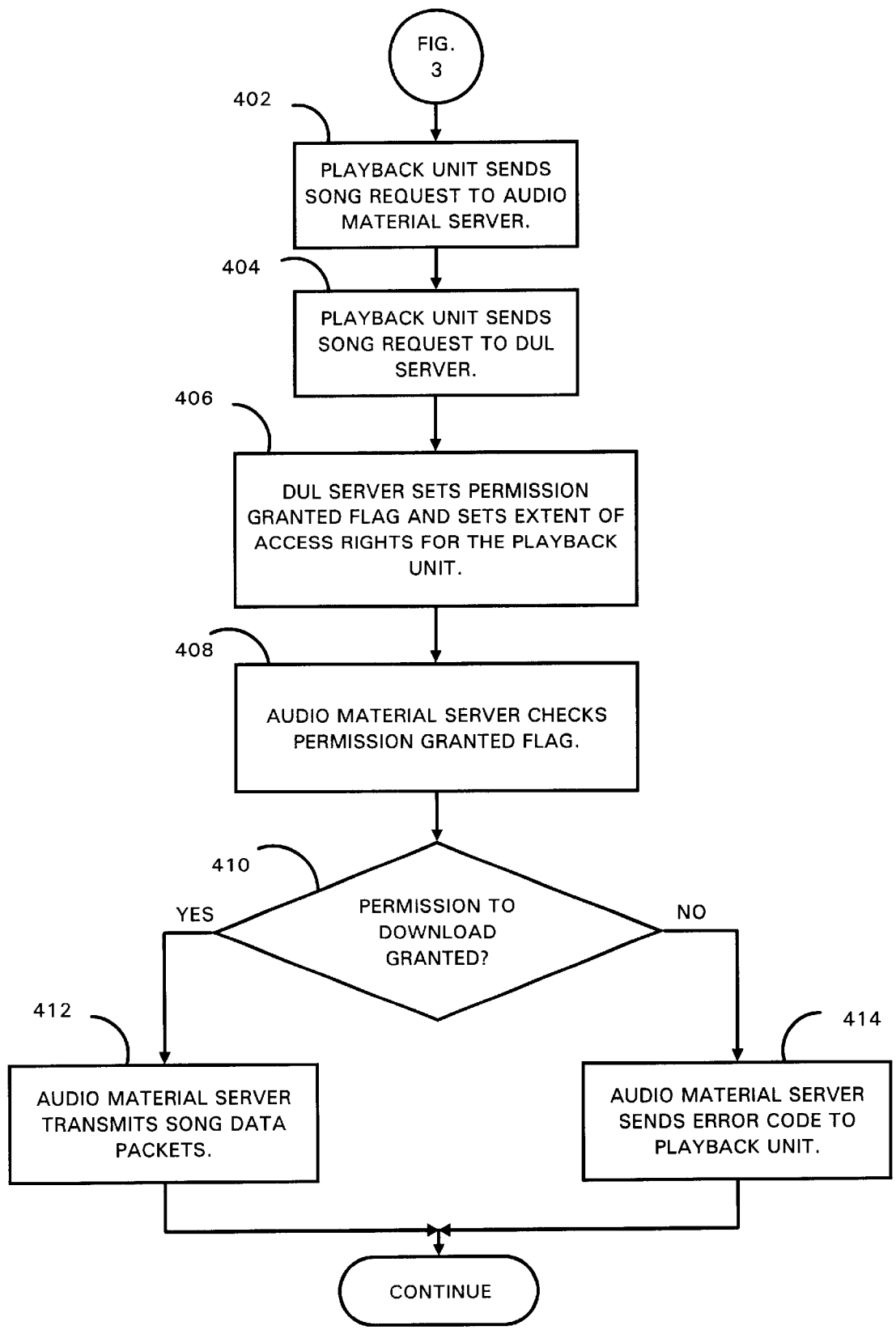

At the decision box numbered 306, the DUTL server checks to determine if the received song list is current. If the song list is not current, a negative outcome at the decision box 306, then a new song list is available and the server sends back an updated song list, as represented by the flow diagram box numbered 308. If the playback unit song list is already current, an affirmative outcome at the decision box 306, then no song list data transmission from the DUL server is needed. With a confirmed current song list, the user is now permitted to select a track from among those available in a selection menu. The selection menus are displayed, for example, on the display area of the interface illustrated in FIG. 2. The user may need to scroll up and down the displayed selection menu list. Tracks can be selected by artist, genre, disc name, or a number of other factors. The operation of a user making an artist and song selection is represented by the flow diagram box numbered 310. At the next step, represented by the flow diagram box numbered 312, the playback unit sends the user-requested song title information to the DUL server. The DUL server returns the network address for the requested song. This step is represented by the flow diagram box numbered 314. The playback unit is now ready to retrieve audio material from the network. The flow diagram for these operations continues in FIG. 4.

In the case of an Internet network connection, the returned network address is referred to as the uniform resource locator (URL) for the song. Once the song URL is received, the playback unit initiates communication with the appropriate audio material server to request the song from the appropriate directory. This step is represented by the FIG. 4 flow diagram box numbered 402. In the preferred embodiment, the DUL server maintains control over communication from the playback unit to the network, and therefore the DUL server can determine if the audio material server at the indicated URL is inactive or not responding. If either is the case, then the DUL server will detect this condition and may send the URL of a backup or alternate audio material server at which the requested song is stored. In this way, the user may still gain access to the requested song and listen to it.

When the playback unit sends the song request to the server whose URL it received from the DUL server, it also sends a user identification code (user ID) and encrypted password information to the DUL server. This step is represented by the flow diagram box numbered 404. That is, because the DUL server maintains communication control, the DUL server can perform a gatekeeping function to permit or prevent the playback unit from receiving the requested audio material. If the user ID and password information is validated, then the DUL server sets a permission granted flag that is checked by the appropriate audio material server. The permission granted flag may be stored at the DUL server and remotely checked by the audio material server, or otherwise communicated to the audio material server. This operation step is represented by the flow diagram box numbered 406.

The permission granted flag dictates whether or not a user will be permitted to download a song for listening and also for recording. Other authorizations, in accordance with the Secure Digital Music Initiative (SDMI) for example, may be accommodated. That is, the permission granted flag may grant or deny a range of distribution, reproduction, copy, and recording rights. Thus, the permission granted flag may include a copy authorization flag to control digital copying. These rights may be granted in accordance with predetermined arrangements between commercial music interests and artists on the one hand, and entities controlling the DUL server and audio material servers on the other hand. If permission to record is granted, for example, a feature of the output interface will be set to permit an output format that is suitable for recording. If the user is not granted recording privileges, then no output will be available at the needed output connections of the output interface, or any attempt to exceed the granted song rights will result in display of an error message on the display interface and a halt to operations of the playback unit.

Thus, after the permission granted flag is set by the DUL server at step 406, the audio material server checks the flag at step 408. The flag may be sent to the audio material server by the DUL server or forwarded by the playback unit. If the permission granted flag indicates that the user has been granted permission to download the requested song, an affirmative outcome at the decision box 410, then at the flow diagram box numbered 412 the audio material server transmits the audio material (comprising a sound file or streaming audio information) to the playback unit, where it is received by the network interface as described above. Other operation of the playback unit then continues. If the permission granted flag indicates that the user has not been granted permission to download the song, a negative outcome at the decision box 410, then at the flow diagram box numbered 414 the audio material server sends an error code to the playback unit to halt operation. Similar processing will be performed if other user actions are attempted that require authorization, such as digital copying.

Playback Unit Processor Operating Steps

Figure 5:
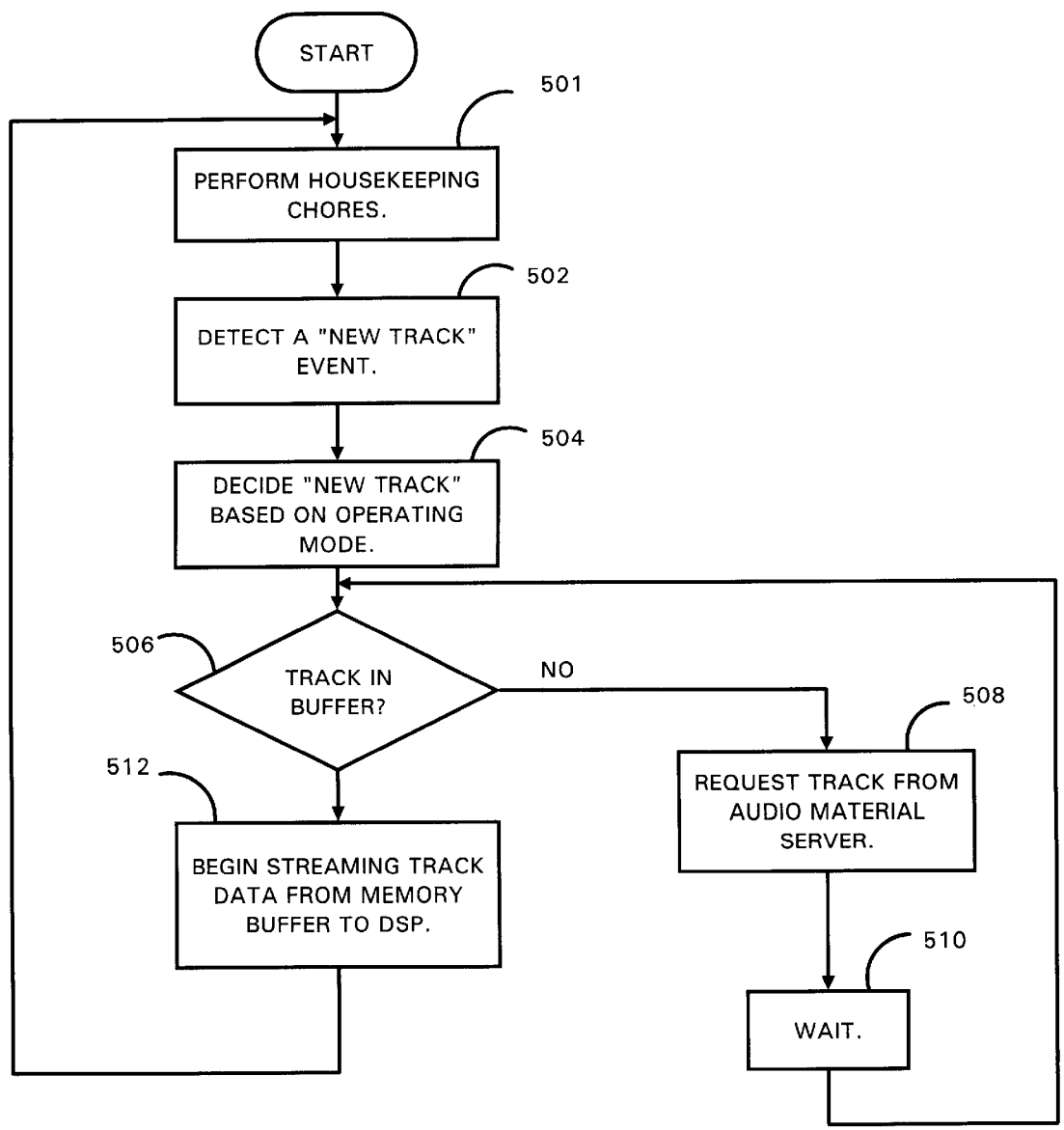
FIG. 5 is a processing flow diagram that illustrates the processing steps executed by the playback unit processor illustrated in FIG. 1.

FIG. 5 is a processing flow diagram of the processing steps executed by the playback unit microprocessor 118 shown in FIG. 1, and illustrates the processing repeatedly executed by the microprocessor during operation for responding to user commands. During operation, the microprocessor executes "housekeeping" chores as part of typical background processing as indicated by the flow diagram box numbered 501. The housekeeping chores include, for example, updating the user display, scanning the user keypad buttons for actuation, scanning any infrared receiver for user input, and downloading tasks. The downloading tasks may include, for example, downloading the first few seconds of each track on a current selected disc to reduce the latency time when one of the tracks is later selected by the user. Such samples from the tracks may be stored in the memory of the playback unit for later listening. FIG. 5 illustrates processing when a "New Track" event is detected.

The detection of a user action at the user interface and display is represented by the first FIG. 5 flow diagram box numbered 502, which indicates that the processor detects a "New Track" event. A "New Track" event is defined to be a user action such as selection of the Play button, Skip Track button, or other button such as "Jump Track" or "Change Disk" or the like. Upon receipt of a "New Track" event, the microprocessor determines the system operating mode, which may comprise either a normal mode, random mode, or custom mode. This step is represented by the flow diagram box numbered 504.

The system operating modes specify an algorithm for determining the next track. The normal mode specifies that the "next" track is the next sequential track in the selected compilation. The random mode specifies that the "next" track is a randomly selected track in the selected compilation. The custom mode specifies that the "next" track is a user programmed track, such as when a user records a program of track selections for playback in the programmed order.

Once the "next" track is determined in accordance with the operating mode, the microprocessor determines if the next track is in the memory buffer of the playback unit. If the next track is not in the buffer, a negative outcome at the decision box 506, then the microprocessor requests the missing track from the appropriate audio material server. The request is represented by the flow diagram box numbered 508. The microprocessor waits for receipt of the missing track, as indicated by the flow diagram box numbered 510, and then loops to the decision box 506 again. Once a sufficient portion of the track is received or otherwise located in the buffer, an affirmative outcome at the decision box 506, the microprocessor begins streaming the audio material data from the memory buffer to the DSP for processing. The DSP may be one of a number of commercially available DSP engines for the decompression and decoding processing of digital audio data. Those skilled in the art will understand the processing involved without further explanation.

Data Packets

Figure 6:
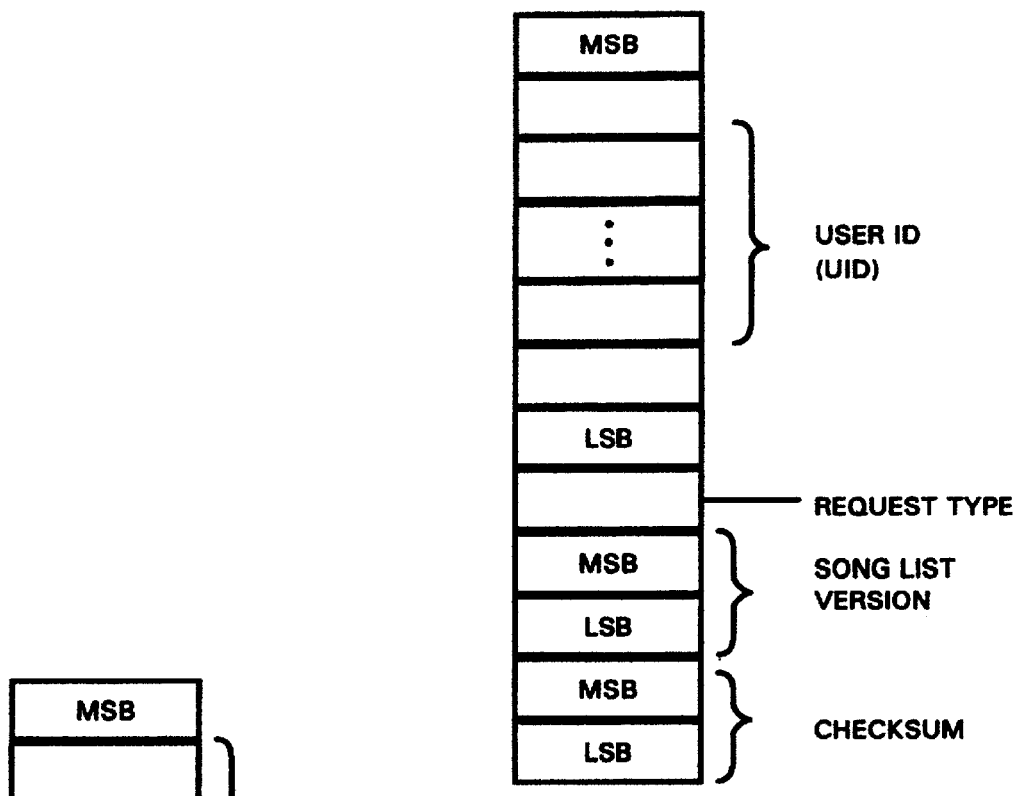
FIGS. 6, 7, 8, 9, and 10 are representations of packet information processed by the playback unit illustrated in FIG. 1.
Figure 7:
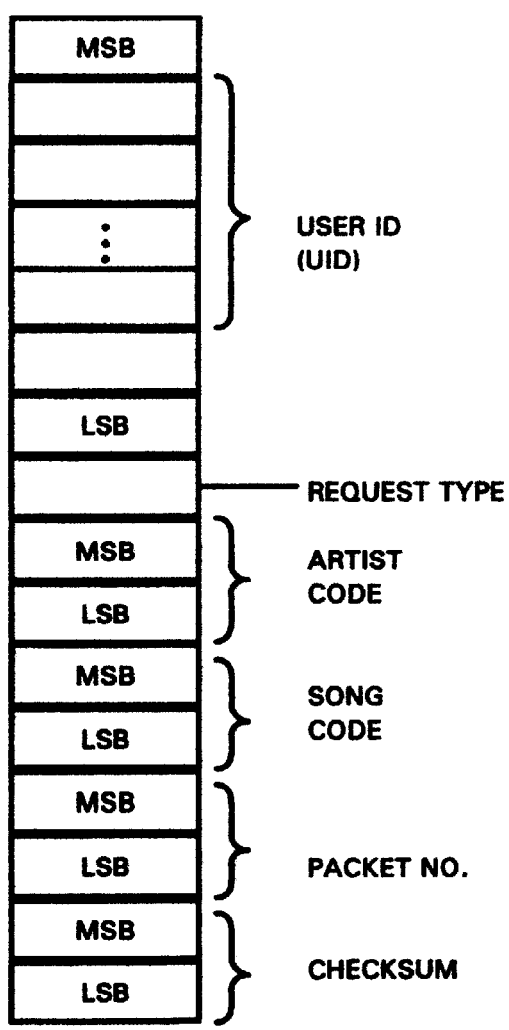
Figure 8:
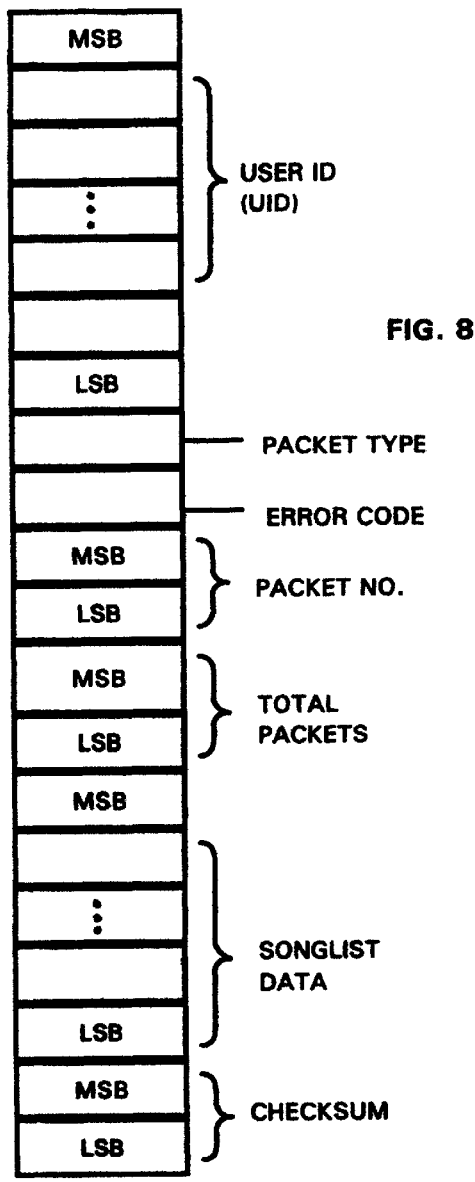
Figure 9:
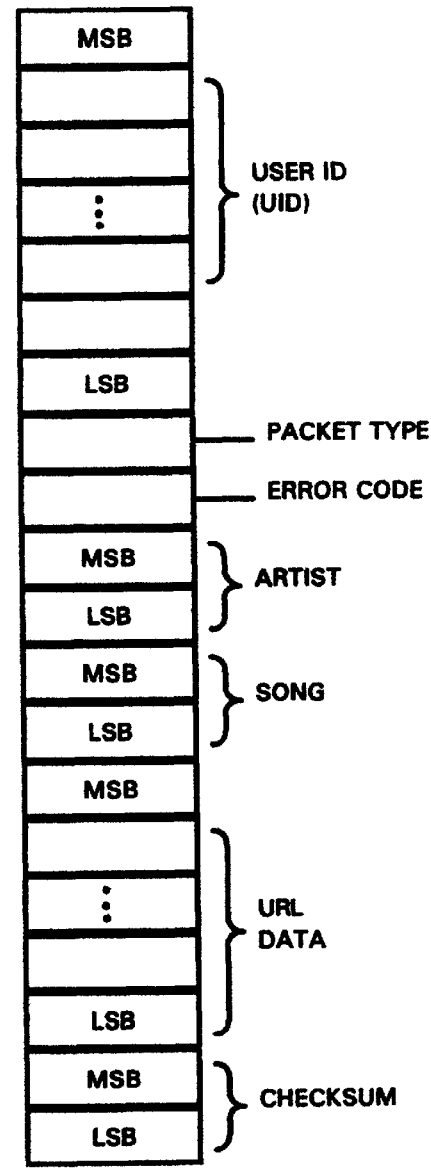
Figure 10:
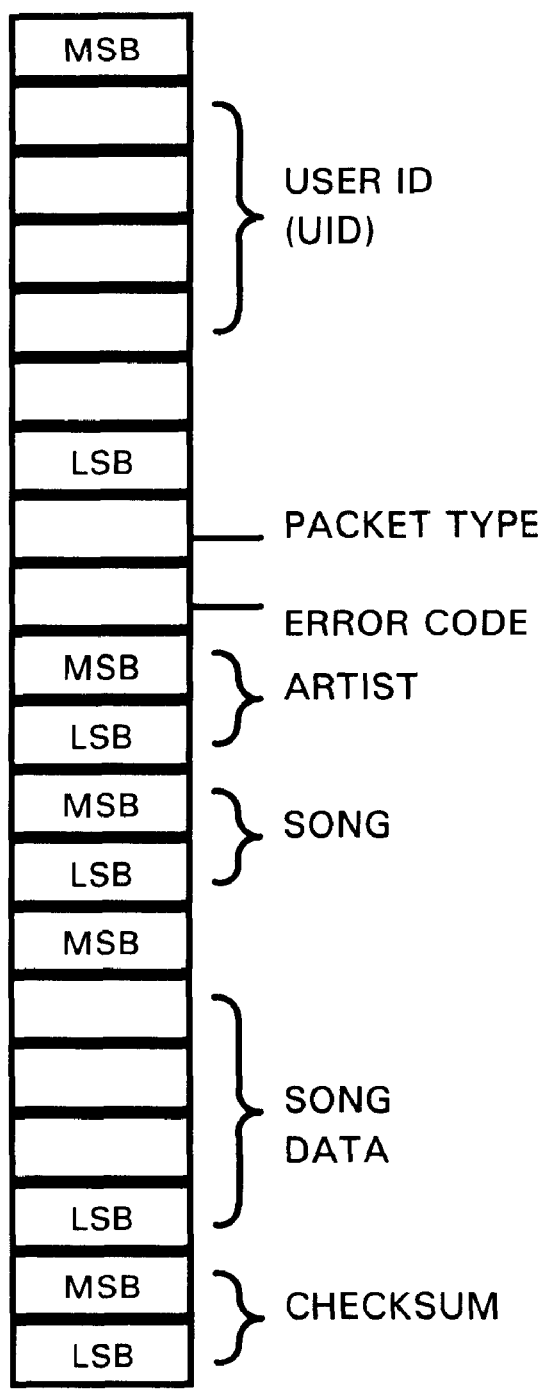

As noted above, the network interface can communicate using a number of different protocols having a variety of physical connection schemes. FIGS. 6, 7, 8, 9, and 10 show the data bytes of exemplary data packets that can be used to communicate the different types of information needed for operation of the system constructed in accordance with the present invention. FIG. 6 illustrates the data packet when the playback unit requests a song list version check. FIG. 7 illustrates the data packet used when the playback unit requests a song from the audio material server. FIG. 8 illustrates the data packet used when the DUL server sends an updated song list to the playback unit. FIG. 9 illustrates the data packet when the DUL server sends the URL of a song to the playback unit. FIG. 10 illustrates the data packet when an audio material server sends a song to the playback unit. It should be understood that the data packets of FIGS. 6 through 10 are intended only to illustrate the type of information that may be exchanged between the playback unit, DUL server, and audio material server, and should not be taken in a limiting sense as a requirement for operation of a system constructed in accordance with the present invention.

FIG. 6 shows the user request data packet. With this packet, the playback unit requests a check to ensure the song list being used is current. The first eight bytes comprise an optional user ID field that would be sent so the DUL server can identify who is requesting the song list. The next byte is a request field that permits the DUL server (or any other network server) to identify what data is being requested by the client playback unit. The next two bytes comprise a song list version field that provides the version number of the song list currently stored in the memory of the playback unit. Finally, the last two bytes of the data packet contain checksum data for identifying any errors that might occur during transmission over the network connection.

FIG. 7 shows the song request data packet. The first eight bytes contain the optional user ID data and the next byte contains the request data, as described above for FIG. 6. The next two bytes contain an artist code comprising a unique identification number for an artist of a song. The artist code (AC) can be used as an index to the directory on the audio material server that contains the artist's work. The next two bytes contain the song code (SC) comprising a unique identification code for the requested song. The song code can be used as an index to the song data file on the audio material server. The next two bytes contain a packet identification code (packet ID) that tells the audio material server which packet to send next. That is, because each song to be downloaded is sent in several pieces, the playback unit must be able to communicate to the audio material server which portion of the song is needed next. The last two bytes comprise the checksum field for identifying errors.

FIG. 8 shows the updated song list packet, which is sent from the DUL server to the playback unit. The first eight bytes contain the user ID, which in this case is returned to the playback unit for purposes of error checking, to confirm that the updated song list information was sent to and received by the correct playback unit. The next byte contains packet type data, which is necessary to let the playback unit know how to interpret the data it receives. That is, the packet type data for this transmission lets the playback unit know that an updated song list is being sent. The most significant bit (MSB) position indicates whether or not this is the last packet of data that will be sent with this type of information. An error code (EC) byte is next, which provides the error code that (if necessary) is displayed on the display component. A two-byte packet ID field is next, and is used to let the playback unit know which area of the memory in which the data needs to be stored. That is, the song list data is organized according to a predetermined arrangement and the playback unit needs to conform its memory to that predetermined arrangement. Next is a two-byte field that provide the total number of packets to transmit the song list update information. This is needed so the playback unit can adjust the buffering scheme. The next field has a variable number of bytes, as it contains the songlist data. This number may vary depending on the network connection and the transmission protocol being used, among other considerations that will occur to those skilled in the art. Finally, the last two bytes of the updated song list packet comprise checksum data for identifying errors.

FIG. 9 shows the packet containing the URL of a requested song. The first eight bytes contain the user ID, which as before is returned to the playback unit for purposes of error checking, to confirm that the requested information was sent to and received by the correct playback unit. The next byte contains packet type data, which is necessary to let the playback unit know how to interpret the data it receives. In this case, the packet type data will indicate that a URL is being sent, and the MSb position will indicate whether or not this is the last packet of data that will be sent with this URL information. An EC byte is next, to provide any error code to be displayed on the display component. The next two bytes are an artist code (AC) that is sent to the playback unit to ensure that it can place the URL data in the correct memory buffer. A song code (SC) occupies the next two bytes, the code being used to ensure that the playback unit places the URL data in the correct memory buffer. The next four bytes contain URL data that identifies the audio material server that contains the desired song for playback. The last two bytes of the URL packet contain the checksum data for identifying errors that occur during transmission.

FIG. 10 shows the song data sent by an audio material server to the playback unit. The user ID is contained in the first eight bytes, returned as a form of error checking and to confirm that the requested song information was sent to and received by the correct playback unit. The packet type data is contained in the next byte, and in this case the MSb indicates whether or not this is the last packet that will be sent. The EC is contained in the next byte. The AC occupies the next two bytes, to ensure that the playback unit places the song information in the correct memory buffer. The SC occupies the following two bytes, again sent to ensure that the playback unit places the song information in the correct buffer. The next field contains the actual song data and has a variable number of bytes. The number of bytes of song data may vary depending on the network connection and the transmission protocol being used, among other considerations that will occur to those skilled in the art. The song data will be placed in a section of memory that depends on the artist, song, and packet number. Finally, the last two bytes of the song data packet comprise checksum data for identifying errors.

Memory Buffering Control

Figure 11:
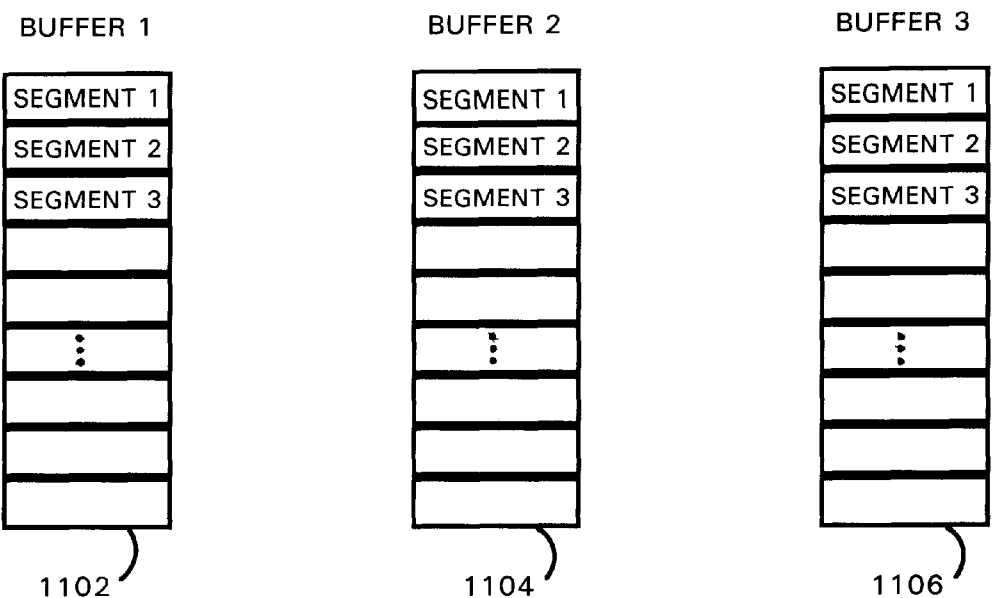
FIG. 11 is a representation of the buffers contained in the memory illustrated in FIG. 1.

FIG. 11 is a representation of the buffering operations of the playback unit. The playback unit memory may be segregated into a number of sequential buffers, with each buffer preferably containing one song. Based on typical compression algorithms, the size of each buffer will be approximately two megabytes (2 MB). The number of buffers that can be accommodated by the playback unit is determined by the amount of memory (bytes) that the playback unit microprocessor can access, so the number of buffers available will be variable. Nevertheless, the functionality of the playback unit remains the same regardless of the available memory address space. The addressable portions that make up each buffer will contain data that, when processed, produces approximately ten seconds of audio listening.

The buffering of song data ensures that a song may be downloaded and temporarily stored in less time than needed to play the song. The speed of this buffering operation will depend on the speed of the network connection available. Buffering begins after the user selects one or more songs for listening. The playback unit downloads the selected songs in data packets, which in the preferred embodiment each contain approximately ten seconds of compressed digital audio information. As noted above, the number of data packets to be downloaded for each song is an undetermined number that depends on the song length. It is not necessary for song data download to be completed for one song before download for another song can begin. Preferably, portions of each selected song will be downloaded as the first one begins to play. This is illustrated in FIG. 11, which illustrates the multiple buffers 1102, 1104, 1106 into which the memory of the playback unit is segregated. The current song's buffer has priority over all other buffers; the data flow into this buffer is maintained such that continuous playback of the song is guaranteed. The buffers corresponding to the following musical selections are periodically updated with their songs' data.

For example, if a user wants to hear Song1, Song2, and Song3, the playback unit downloads a number of packets for Song1 into the first available buffer 1102. Once a sizeable amount of compressed audio information is stored for that song, the playback unit begins to process the information and play the song, providing the processed information to the home audio system. The audio information will be processed by the microprocessor and sound data DSP, if one is included in the playback unit. The amount of stored information needed before playback begins will depend on the microprocessor, DSP, and other sound components of the playback unit. As the first song (Song 1) is being played, the playback unit continues to operate and, in background operation, continues to download the Song 1 data into the first buffer 1102, and also downloads data for the other selected songs into the other buffers 1104, 1106 in an alternating fashion. Each song will be placed into a different sequential buffer. This ensures that some portion of each selected song will be downloaded and available as soon as possible, thereby permitting the user to skip to one of the other selected songs after playback has begun.

Figure 12:
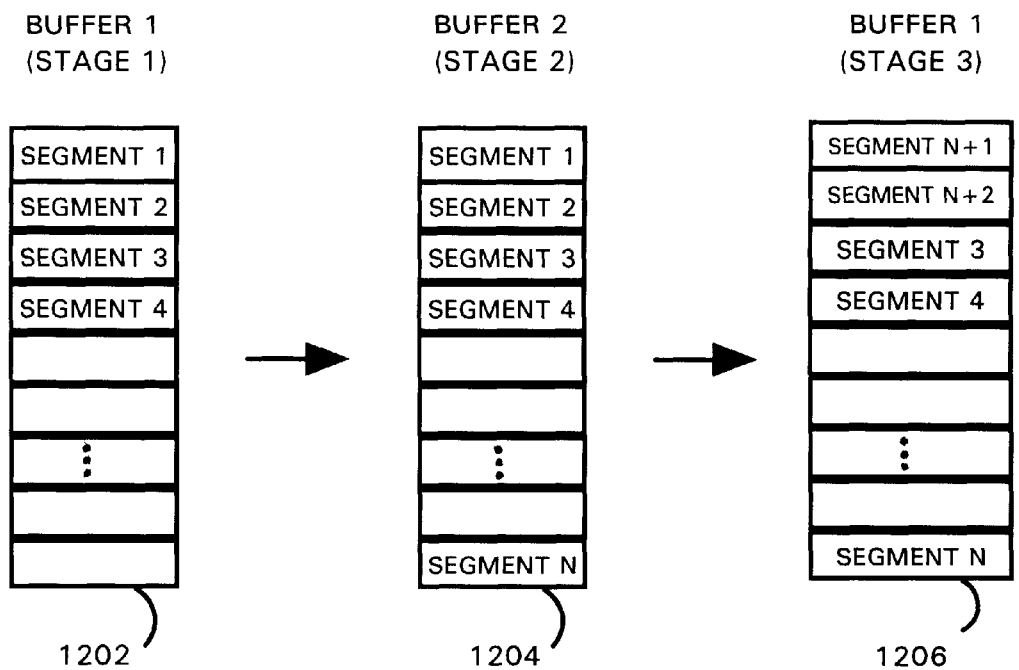
FIG. 12 is a representation of the loop buffering operations executed under control of the microprocessor illustrated in FIG. 1.

The playback unit preferably performs a loop buffering operation, which is illustrated in FIG. 12. The loop buffering operation progresses from left to right in FIG. 12. Loop buffering is used to limit the size needed for each buffer. In particular, a buffer is not expected to have sufficient capacity to contain the entire data needed for one song. Rather, data in a given buffer is overwritten as it is processed and played. Thus, after the last segment of memory in a buffer for a song has been filled with a song data packet and that buffer is processed for listening, the next song data packet will be written to the first segment in that buffer. As described above, this writing will be directed by setting the various fields in the song data packet illustrated in FIG. 9.

Three exemplary stages of loop buffering are illustrated in FIG. 12 from left to right, showing the contents of a buffer at a first stage 1202 of buffering, at a second stage 1204 of buffering, and at a third stage of buffering 1206. As the song is downloaded at the first stage 1202, the buffer is filled with data bytes for Segment 1, Segment 2, Segment 3, and so forth. Eventually, the last available segment in the buffer is filled 1204 with Segment N, before the song has been completely downloaded. Therefore, the next segments of incoming data, Segment N+1, Segment N+2, Segment N+3, and so forth, will overwrite the prior data in the buffer 1206. Buffering will continue looping in this fashion, overwriting repeatedly until the song is completely downloaded.

Loop buffering ensures that the user can scan a song in a backward direction, such as might be done for review to hear missed lyrics or other reason. If a user decides not to listen to the current song and skips it entirely on playback, it remains in the playback unit memory so the user can return to the skipped song and listen to it. In all cases, loop buffering and overwriting of buffer data will not begin until the first segment of the buffer has been processed for listening. That is, listening to a song cannot begin until the buffer for that song is initially filled, and overwriting will not begin until listening to that song has begun. However, if the user adds more songs to the playback unit than can be downloaded into the available memory, then a newer song on the playback list will begin overwriting the oldest song in memory after the last segment of the last available buffer is filled with song data.

System Data Flow Diagram

Figure 13:
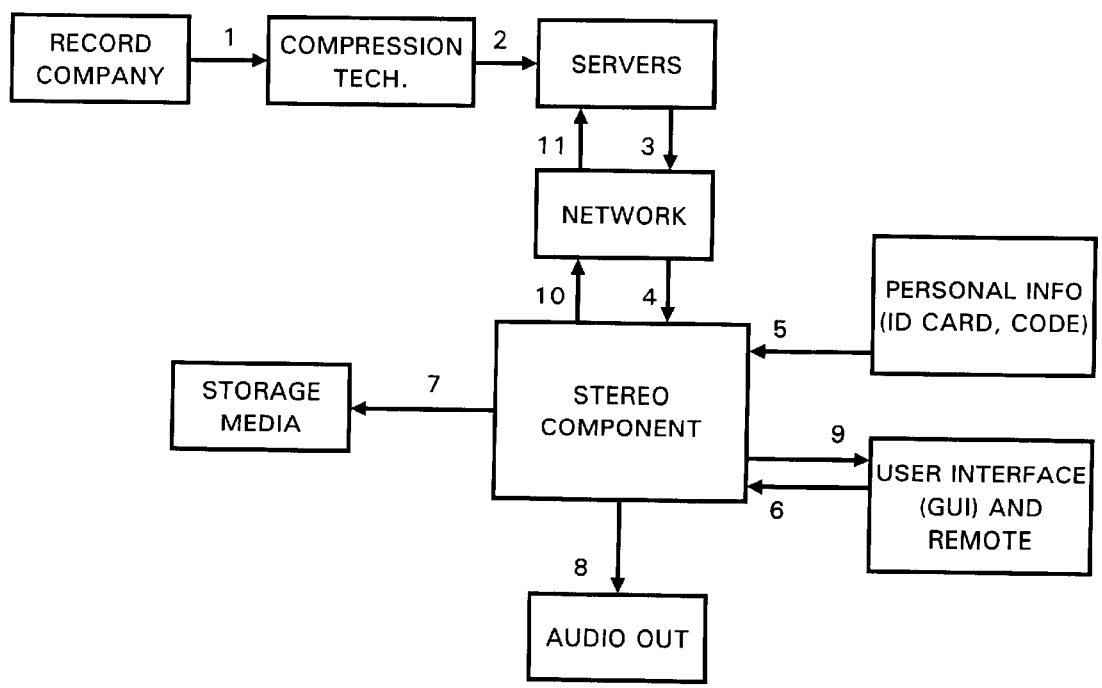
FIG. 13 is a data flow diagram of the FIG. 1 system operation, showing the information that is transmitted among the system components.

FIG. 13 is a data flow diagram of the system of FIG. 1, showing the information that is transmitted among the system components and how those components interact. In a preliminary stage of information flow, music is submitted for digital conversion, data compression, and encoding by commercial music interests, such as a record company or an entertainment music company, or by an artist. This flow from the submitted music to the compression technology is indicated by the FIG. 13 data flow arrow marked "1". After the compression and encoding, the digital information in the form of music files is uploaded to servers, such as the audio material servers described above. The servers maintain file organization, for example, according to musical genre, artist, album or compilation name, and song title. In addition, the servers may store information pertaining to users, such as usual or preferred selection patterns, so that a predictive loading scheme can be used to direct downloads in of music files. For example, the first ten seconds of a user's one-hundred most frequent selections may be downloaded immediately upon receipt of that user's identification number, to minimize any delay associated with the typical query and response processing. The data flow from the compression technology to the servers is indicated by the FIG. 13 data flow arrow marked "2".

After a user requests a song, the system responds by sending a data stream from a server through any established data transfer line to the music information network. In the preferred embodiment, this network is the Internet. Connecting the users and the servers through the Internet provides a convenient and easily accessible means of transferring the music information from the servers to the users. The data stream includes a copy flag code indicating whether the requested audio material is for immediate listening only or if digital copying and recording rights are also requested. The data flow from the servers to the music information network is indicated by the FIG. 13 data flow arrow marked "3". At the playback unit, indicated as the "Home Audio Component" in FIG. 13, network interface is used to receive the data stream, as indicated by the data flow arrow marked "4". The data transfer methods may include, for example, use of analog telephone line communication, ISDN services, high-speed cable communications for video and digital data, and the like.

Next, the user identification information provides identification of the listener for billing purposes and for personalization features, such as described above. The user identification information can be entered, if desired, using a card with magnetically encoded user information, so such as a credit card, or the information can be entered manually through the user display interface. A default ID may also be associated with the unit itself. The data flow of personal information from the user to the playback unit is indicated by the FIG. 13 data flow arrow marked "5".

As described above, searching of available audio material may be carried out by a user through the user display interface. The data flow from the user display interface to the playback unit is indicated by the FIG. 13 data flow arrow marked "6" and contains commands issued from the user display interface to the main unit. In the preferred embodiment, the most commonly used controls of the playback unit closely resemble those of a conventional multiple-disc CD player, including disc select, play, fast forward, and the like. These controls, as well as the search functions, can be instantiations of objects that are part of the graphical user interface (GUI) of the user display. This GUI may be replicated on a remote control device, as indicated in FIG. 13.

After the user has used the GUI to select music, one of the options that can be permitted by the system is to send the digital output of audio material to a storage device for digital recording on storage media, as indicated by the FIG. 13 data flow arrow marked "7". Alternatively, an analog audio signal is sent from the playback unit to audio connections of the home audio system, as indicated by the FIG. 13 data flow arrow marked "8". While music is being delivered to the designated destinations, the user display interface shows information concerning the current and upcoming user selections. The data flow from the playback unit to the user display interface is indicated by the FIG. 13 data flow arrow marked "9".

During the time a user is cleared via the personal information for accessing the servers, the user may upload additional information and queries using the network communications, as indicated by the FIG. 13 data flow arrow marked "10". Using the appropriate network protocols, the correct server is contacted. For example, different servers may have different types of musical genres, or the servers may each store many different types of music. The data flow from the network to the servers is indicated by the FIG. 13 data flow arrow marked "11".

Figure 14:
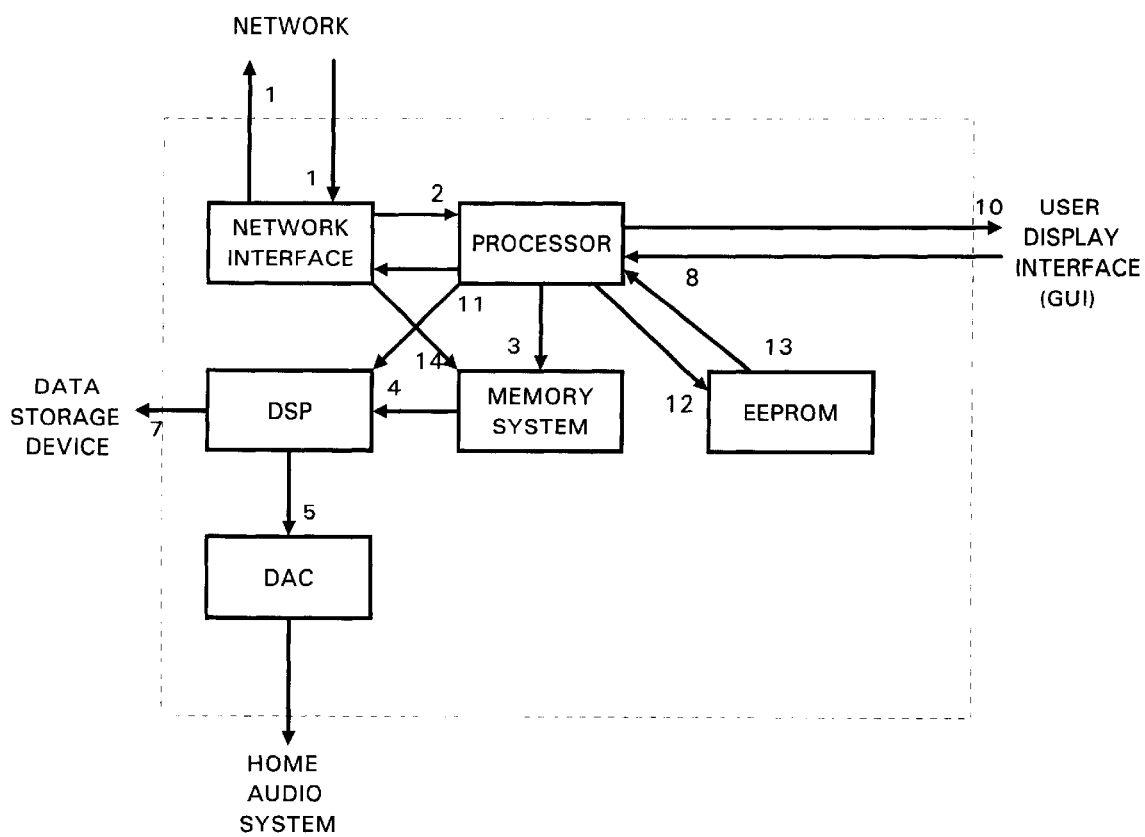
FIG. 14 is a data flow diagram of the playback unit operation, showing the information that is transmitted among the playback unit components.

FIG. 14 is a data flow diagram of the playback unit illustrated in FIG. 1, showing the information that is transmitted among the playback unit components and how those components interact. As noted above in the discussion of FIG. 13, a network data stream is received at the playback unit. The FIG. 14 data flow arrow marked "1" indicates that the data stream is received at a network interface for the conversion of received data into a data stream that can be used by the playback unit. As noted above, the data may be received through an analog telephone line communication, ISDN services, high-speed cable communications for video and digital data, or similar scheme. Thus, two-way network communication is contemplated for the receipt of this information over the network. Next, the received identification data is provided to the processor of the playback unit. The data flow from the network interface to the processor is indicated by the FIG. 14 data flow arrow marked "2". Initially, the processor sends the received audio material to the memory, as indicated by the FIG. 14 data flow arrow marked "3". The processor then determines how to process and handle the audio material.

In the preferred embodiment, the playback unit includes a digital signal processor (DSP) that is specially designed to perform audio decompression. The processor determines when the received audio material in the form of compressed digital files are sent to the DSP and when the audio material is simply erased or overwritten. This action is represented by the FIG. 14 data flow arrow marked "4". At the DSP, the processed audio material is sent to the digital-to-analog converter (DAC) subsystem for output to the home audio system for listening. The data flow from the DSP to the DAC is indicated by the FIG. 14 data flow arrow marked "5". The data flow from the DAC to the home audio system is indicated by the FIG. 14 data flow arrow marked "6". If digital copying of the audio material has been authorized (such as described above in connection with the data flow arrow of FIG. 13 numbered "7"), then the DSP sends digital output to a digital media storage device. The data flow from the DSP to the storage device is indicated by the FIG. 14 data flow arrow marked "7".

In FIG. 13, it was noted that a user may upload additional information and queries during the time a user is cleared via the personal information for accessing the servers. It should be understood that such communications must first proceed from the user through the playback unit processor and through the network interface to the servers. In FIG. 14, the data flow of instruction and information from the user, via the user display interface, is indicated by the data flow arrow marked "8". The data flow of user information and queries from the processor to the network interface is indicated by the data flow arrow marked "9". The processor may convey return information back to the user through the user display interface, as indicated by the FIG. 14 data flow arrow marked "10".

The information received by the processor includes a copy authorization flag that permits or prohibits digital copying. This permits, if needed, compliance with regulatory schemes such as the U.S.A. Serial Copy Management System (SCMS), or the SDMI format, or forms of digital signature or digital watermark authorizations. Thus, depending on the received information, the processor determines whether the DSP output will be sent to the DAC for output to the home audio system or to a storage device for digital recording. The data flow of processor command to the DSP for output control is indicated by the FIG. 14 data flow arrow marked "11".

The playback unit preferably includes an EEPROM that permits convenient updates of functionality and features. Thus, new programming code and data can be stored into the EEPROM under control of the processor. The data flow of processor command from the processor to the EEPROM is indicated by the data flow arrow marked "12". The data flow of programming instructions and data from the EEPROM to the processor is indicated by the data flow arrow marked "13".

Finally, the audio material, stored in compressed format, may include partial downloads of music files, as commanded by the received data packets (described above). These partial downloads may have been selected, for example, by the predictive downloading schemes that respond to user information (see the data flow arrow of FIG. 13 marked "2"). The partial downloads are received at the playback unit and stored in the memory. The data flow of audio to material from the network interface to the memory is indicated by the FIG. 14 data flow arrow marked "14".

Thus, the music playback system described above provides an interface between a conventional home audio system and a network source for audio material comprising a playback unit with a simple operating system that is not accessed by the user and does not require the launch of special software to initiate playback. Therefore, the playback unit can be operated without special computer skills and without navigating complicated PC-like display windows. Access to audio material and distribution rights are controlled by the DUL servers and audio material servers, thereby enabling the playback unit to retrieve a wide range of digital audio material from the network on demand and vastly expanding the range of music available for playback. In this way, the system permits the reproduction of music using the home audio system, for high quality playback in a comfortable setting, and provides controlled access to audio material and controlled distribution and duplication of the material.

The present invention has been described above in terms of a presently preferred embodiment so that an understanding of the present invention can be conveyed. There are, however, many configurations for network-based music playback systems not specifically described herein but with which the present invention is applicable. The present invention should therefore not be seen as limited to the particular embodiments described herein, but rather, it should be understood that the present invention has wide applicability with respect to network-based music playback systems generally. All modifications, variations, or equivalent arrangements and implementations that are within the scope of the attached claims should therefore be considered within the scope of the invention.

We claim:

1. A playback apparatus for receiving digital audio material from a network server and providing it to a home audio system for playback, the apparatus comprising:
    a user interface that receives commands from a user for selection of an audio composition from a network server, for initiating receipt of the digital audio material comprising portions of the selected audio composition, and for controlling playback of the received digital audio material, wherein the user interface includes a display that shows status of the playback;
    a memory that contains operating system instructions and that temporarily stores the digital audio material comprising portions of the selected audio composition, such that digital audio material comprising the complete selected audio composition is not available to the user from the memory; and
    a processor that executes the operating system instructions stored in the memory to perform apparatus functions in response to the user commands and to initiate the playback of received digital audio material.

2. A playback apparatus as defined in claim 1, wherein the apparatus functions performed by the processor include display of a menu selection list, from which the user will make the selection of the audio composition.

3. A playback apparatus as defined in claim 2, wherein the apparatus functions performed by the processor include sending a current song list version for the selected musical category to a network server and receiving an indication from the network server if the current song list is in need of updating.

4. A playback apparatus as defined in claim 2, wherein the apparatus functions performed by the processor include sending the user selection to a network server and receiving from the network server the network address of audio material comprising the user selection.

5. A playback apparatus as defined in claim 4, wherein the apparatus sends the user selection to a network directory and user list server and a network audio material server, wherein the directory and user list server checks user information against a list of authorized users to control download of audio material and the audio material server provides the audio material comprising the selected composition.

6. A playback apparatus as defined in claim 5, wherein the directory and user list server sets a copy authorization flag that is provided to the audio material server, and the audio material server checks the copy authorization flag to determine if digital copying at the apparatus will be permitted.

7. A playback apparatus as defined in claim 6, wherein the apparatus functions performed by the processor include processing the received audio material to provide an analog output signal to the home audio system for playback and listening, and processing the received audio material to provide a digital output stream to a storage media only if digital copying is permitted by the copy authorization flag.

8. A playback apparatus as defined in claim 6, wherein playback apparatus receives the audio material from the audio material server in a plurality of packets that are temporarily stored in the playback apparatus memory.

9. A playback unit that receives digital audio material from a network server and provides it to a home audio system for playback, the apparatus comprising:
    a user interface that receives commands from a user for selection of an audio composition from a network server, for initiating receipt of the digital audio material comprising portions of the selected audio composition, and for controlling playback of the received digital audio material, wherein the user interface includes a display that shows status of the playback;

a memory that contains operating system instructions and that temporarily stores the digital audio material comprising portions of the selected audio composition, such that digital audio material comprising the complete selected audio composition is not available to the user from the memory; and a processor that executes the operating system instructions stored in the memory to perform apparatus functions in response to the user commands and to initiate the playback of received digital audio material, wherein the apparatus functions performed by the processor include (1) display of a menu selection list from which the user will make the selection of the audio composition, (2) sending the user selection to a network server and receiving the audio material comprising the user selection, (3) processing the received audio material to provide an analog output signal to the home audio system for playback and listening, and (4) processing the received audio material to provide a digital output stream to a storage media only if digital copying permission was granted by a received copy authorization flag.

10. A playback apparatus as defined in claim 9, wherein the playback apparatus receives the audio material from the audio material server in a plurality of packets that are temporarily stored in the playback apparatus memory.

11. A playback apparatus as defined in claim 9, wherein the apparatus functions performed by the processor include sending a current song list version for the selected musical category to a network server and receiving an indication from the network server if the current song list is in need of updating.

12. A playback apparatus as defined in claim 11, wherein the apparatus sends the user selection to a network directory and user list server and a network audio material server, wherein the directory and user list server checks user information against a list of authorized users to control download of audio material and the audio material server provides the audio material comprising the selected composition.

13. A playback apparatus as defined in claim 12, wherein the directory and user list server sets a copy authorization flag that is provided to the audio material server, and the audio material server checks the copy authorization flag to determine if digital copying at the apparatus will be permitted.

14. A playback apparatus as defined in claim 13, wherein the playback apparatus receives the audio material from the audio material server in a plurality of packets that are temporarily stored in the playback apparatus memory.

15. A method of operating a playback apparatus that receives digital audio material from a network server and provides it to a home audio system for playback, comprising the steps of:

selecting an available music category through a user interface supported by an operating system that is stored in memory of the playback apparatus;

sending a current song list version for the selected music category to a network server and receiving an updated song list if the current song list is in need of updating;

selecting an available composition, sending the selected composition title to a network server, and receiving from the network server the network address of a network audio material server at which audio material comprising the user selection is stored;

receiving the audio material from the network audio material server; and processing the received audio material to provide an analog output signal to the home audio system for playback and listening, and processing the received audio material to provide a digital output stream to a digital storage media only if digital copying is permitted by a copy authorization flag.

16. A method as defined in claim 15, wherein the step of receiving the audio material comprises receiving the audio material from the network audio material server in a plurality of packets that are temporarily stored in memory of the playback apparatus.

17. A method as defined in claim 15, further including the steps of sending the user selection to a network directory and user list server and the network audio material server, wherein the directory and user list server checks user information against a list of authorized users to control download of audio material.

18. A method as defined in claim 17, wherein the copy authorization flag that is checked in the step of processing the received audio material is set by the directory and user list server and is provided to the network audio material server, and the audio material server checks the copy authorization flag to determine if digital copying at the apparatus will be permitted.

19. A method of operating a playback apparatus that receives digital audio material from a network server and provides it to a home audio system for playback, the method comprising:

receiving user commands through an operating system that is stored in semiconductor memory for selection of an audio composition from a network server;

receiving digital audio material from the network server;

temporarily storing the digital audio material comprising portions of the selected audio composition in playback apparatus memory, such that digital audio material comprising the complete selected audio composition is not stored in the memory at the same time; and processing the received audio material to provide an analog output signal to the home audio system for playback and listening, processing the received audio material to provide a digital output stream to a storage media only if digital copying permission was granted by a received copy authorization flag.

20. A method as defined in claim 19, wherein the step of receiving digital audio material comprises receiving the audio material from an audio material server in a plurality of packets that are temporarily stored in the playback apparatus memory.

21. A playback apparatus as defined in claim 19, wherein the apparatus functions performed by the processor include sending a current song list version for the selected musical category to a network server and receiving an indication from the network server if the current song list is in need of updating.

22. A method as defined in claim 21, wherein the playback apparatus forwards the user request to a network directory and user list server and to a network audio material server, wherein the directory and user list server checks user information against a list of authorized users to control download of audio material and the audio material server provides the audio material comprising the selected composition upon authorization from the directory and user list server.

23. A method as defined in claim 22, wherein the directory and user list server sets a copy authorization flag that is provided to the audio material server, and the audio material server checks the copy authorization flag to determine if digital copying at the playback apparatus will be permitted.

24. A method as defined in claim 23, wherein the playback apparatus receives the audio material from the audio material server in a plurality of packets that are temporarily stored in the playback apparatus memory.

* * * * *